(12) United States Patent
Zhang

(10) Patent No.: US 11,394,254 B2
(45) Date of Patent: Jul. 19, 2022

(54) WIRELESS CHARGING APPARATUS, DEVICE, SYSTEM, AND METHOD

(71) Applicant: BOE TECHNOLOGY GROUP CO., LTD., Beijing (CN)

(72) Inventor: Zhongwei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 16/977,324

(22) PCT Filed: Dec. 26, 2019

(86) PCT No.: PCT/CN2019/128664
§ 371 (c)(1),
(2) Date: Sep. 1, 2020

(87) PCT Pub. No.: WO2020/140823
PCT Pub. Date: Jul. 9, 2020

(65) Prior Publication Data
US 2021/0006101 A1    Jan. 7, 2021

(30) Foreign Application Priority Data

Jan. 2, 2019 (CN) .......................... 201910001614.4

(51) Int. Cl.
*H02J 50/90* (2016.01)
*H02J 50/80* (2016.01)
(Continued)

(52) U.S. Cl.
CPC ............ *H02J 50/90* (2016.02); *H02J 7/0047* (2013.01); *H02J 50/10* (2016.02); *H02J 50/80* (2016.02)

(58) Field of Classification Search
CPC ...................................................... H02J 50/90
(Continued)

(56) References Cited

U.S. PATENT DOCUMENTS

2008/0211458 A1* 9/2008 Lawther ................ H02J 50/90
320/132
2010/0081378 A1* 4/2010 Kawamura ............ H02J 5/005
455/41.1
(Continued)

FOREIGN PATENT DOCUMENTS

CN    102790417 A    11/2012
CN    204441977 U     7/2015
(Continued)

OTHER PUBLICATIONS

International Search Report of PCT/CN2019/128664 in Chinese, dated Mar. 27, 2020 with English Translation.
(Continued)

*Primary Examiner* — Edward Tso
*Assistant Examiner* — Ahmed H Omar
(74) *Attorney, Agent, or Firm* — Collard & Roe, P.C.

(57) ABSTRACT

The present disclosure provides a wireless charging device, an electronic device, a wireless charging system and a wireless charging method. The wireless charging device includes: a transmitting coil; a first communication circuit, configured to receive relative position information of a receiving coil of a device to be charged; a plurality of prompters, the plurality of prompters being arranged around the transmitting coil; and a controller, configured to generate a trigger instruction of the prompter, according to the relative position information in combination with a relative positional relationship between the plurality of prompters and the transmitting coil, and control the prompter at a corresponding position to be turned on, to indicate a placement position of the device to be charged, so as to align the transmitting coil and the receiving coil.

14 Claims, 7 Drawing Sheets

(51) Int. Cl.
*H02J 50/10* (2016.01)
*H02J 7/00* (2006.01)

(58) Field of Classification Search
USPC .......................................... 320/108
See application file for complete search history.

(56) References Cited

U.S. PATENT DOCUMENTS

2011/0004278 A1* 1/2011 Aghassian ........... A61N 1/3787
607/61
2017/0012460 A1 1/2017 Hayashi

FOREIGN PATENT DOCUMENTS

| CN | 106451631 A | 2/2017 |
| CN | 106921223 A | 7/2017 |
| CN | 107276254 A | 10/2017 |
| CN | 108072314 A | 5/2018 |

OTHER PUBLICATIONS

Written Opinion of the International Searching Authority of PCT/CN2019/128664 in Chinese, dated Mar. 27, 2020.
Chinese Office Action in Chinese Application No. 201910001614.4 dated Nov. 25, 2021 with English translation.

* cited by examiner

WIRELESS CHARGING APPARATUS, DEVICE, SYSTEM, AND METHOD

CROSS REFERENCE TO RELATED APPLICATIONS

This application is the National Stage of PCT/CN2019/128664 filed on Dec. 26, 2019, which claims priority under 35 U.S.C. § 119 of Chinese Application No. 201910001614.4 filed on Jan. 2, 2019, the disclosure of which is incorporated by reference.

TECHNICAL FIELD

The present disclosure relates to a wireless charging device, an electronic device, a wireless charging system and a wireless charging method.

BACKGROUND

At present, most wireless charging devices adopt an electromagnetic induction principle. During a charging process, a case may exist that a transmitting coil of a wireless charging device (a wireless charging transmitter) and a receiving coil of a device to be charged (a wireless charging receiver) are misaligned, which affects charging efficiency and power.

SUMMARY

At a first aspect, an embodiment of the present disclosure provides a wireless charging device, the wireless charging device comprises: a transmitting coil; a first communication circuit, configured to receive relative position information of a receiving coil of a device to be charged; a plurality of prompters, the plurality of prompters being arranged around the transmitting coil; and a controller, configured to generate a trigger instruction of the prompter, according to the relative position information in combination with a relative positional relationship between the plurality of prompters and the transmitting coil, and control the prompter at a corresponding position to be turned on, to indicate a placement position of the device to be charged, so as to align the transmitting coil and the receiving coil.

Optionally, the plurality of prompters are a plurality of light-emitting elements, and the plurality of light-emitting elements are arranged in an array.

Optionally, the plurality of the light-emitting elements are arranged in an array with the transmitting coil as a center.

Optionally, spacings between the light-emitting elements in adjacent rows are identical with each other.

Optionally, the trigger instruction includes an instruction of controlling a corresponding light-emitting element to be lit; and an outer edge of a shape formed by the lit light-emitting element matches an outline of the device to be charged.

Optionally, the trigger instruction further includes an instruction of controlling a corresponding light-emitting element to indicate a placement direction of the device to be charged.

Optionally, the relative position information of the receiving coil includes: perpendicular distances from a center of the receiving coil to four edges of the device to be charged.

Optionally, the wireless charging device provided by an embodiment of the present disclosure further comprises a memory, the memory is configured to store the relative position information of the receiving coil received by the first communication circuit, to supply the relative position information to the controller.

Optionally, the relative positional relationship between the plurality of prompters and the transmitting coil includes coordinate information of the plurality of prompters relative to the transmitting coil.

Optionally, the coordinate information is X coordinate information and Y coordinate information; and the controller is configured to: determine a prompter corresponding to a perpendicular distance range according to the perpendicular distances from the center of the receiving coil to the four edges of the device to be charged and the coordinate information of the plurality of prompters relative to the transmitting coil, to generate a trigger instruction of the prompter corresponding to the perpendicular distance range or the prompter corresponding to a boundary of the perpendicular distance range.

Optionally, the controller is configured to: determine a perpendicular distance from the prompter to the center of the transmitting coil according to the coordinate information of the prompter relative to the transmitting coil; and determine a prompter from which perpendicular distances to the center of the transmitting coil are less than or equal to the perpendicular distances from the center of the receiving coil to the four edges of the device to be charged in a same direction, according to the perpendicular distances from the center of the receiving coil to the four edges of the device to be charged, to determine the prompter corresponding to the perpendicular distance range.

Optionally, the first communication circuit is configured to receive size information of the device to be charged; the controller is further configured to: calculate to obtain a rectangular region of an edge contour of the device to be charged when the receiving coil of the device to be charged is aligned with the transmitting coil, on a Cartesian coordinate system with the center of the transmitting coil as a coordinate origin, according to the relative positional relationship between the prompters and the transmitting coil in combination with the size information of the device to be charged, and the relative position information of the receiving coil of the device to be charged; and generate a trigger instruction of the prompter located within the rectangular region or located at a boundary of the rectangular region.

Optionally, when the prompters are a plurality of light-emitting elements, and the plurality of light-emitting elements are arranged in an array, the controller is configured to: determine or acquire row spacings of the light-emitting elements in four directions which are positive and negative directions of an x-axis and positive and negative directions of a y-axis in a coordinate system with the center of the transmitting coil as the coordinate origin; obtain the perpendicular distances from the center of the receiving coil to the four edges of the device to be charged from the first communication circuit or the memory, and determine or acquire perpendicular distances from the center of the transmitting coil to four edges formed by an innermost loop of an array constituted by the plurality of light-emitting elements; calculate a number of row of light-emitting elements that need to be lit in the four directions in which the perpendicular distances are located, according to the row spacings, the perpendicular distances from the center of the receiving coil to the four edges of the device to be charged, and the perpendicular distances from the center of the transmitting coil to the four edges formed by the innermost loop of the array constituted by the plurality of light-emitting elements.

Optionally, the controller is further configured to: determine whether the receiving coil of the device to be charged is aligned with the transmitting coil; and if the receiving coil is aligned with the transmitting coil, generate an off instruction of the prompter to control the turned-on prompter to be turned off.

At a first aspect, an embodiment of the present disclosure provides a wireless charging method applied to the wireless charging device as any mentioned above, the wireless charging method includes: receiving relative position information of a receiving coil of a device to be charged; generating a trigger instruction of the prompter, according to the relative position information in combination with a relative positional relationship between the prompters and the transmitting coil, and controlling the prompter at a corresponding position to be turned on, to indicate a placement position of the device to be charged, so as to align the transmitting coil and the receiving coil.

Optionally, the relative positional relationship between the prompters and the transmitting coil includes coordinate information of the prompters relative to the transmitting coil, and the relative position information of the receiving coil includes perpendicular distances from a center of the receiving coil to four edges of the device to be charged.

Optionally, the generating a trigger instruction of the prompter, according to the relative position information in combination with a relative positional relationship between the prompters and the transmitting coil, includes: determining the prompter corresponding to a perpendicular distance range according to the perpendicular distances from the center of the receiving coil to the four edges of the device to be charged and coordinate information of the prompters relative to the transmitting coil, to generate a trigger instruction of the prompter corresponding to the perpendicular distance range or the prompter corresponding to a boundary of the perpendicular distance range.

Optionally, the coordinate information is X coordinate information and Y coordinate information, the determining the prompter corresponding to a perpendicular distance range, to generate a trigger instruction of the prompter corresponding to the perpendicular distance range or the prompter corresponding to a boundary of the perpendicular distance range, includes: determining a perpendicular distance from the prompter to the center of the transmitting coil according to the coordinate information of the prompter relative to the transmitting coil; and determining a prompter from which perpendicular distances to the center of the transmitting coil are less than or equal to perpendicular distances from the center of the receiving coil to the four edges of the device to be charged in a same direction, according to the perpendicular distances from the center of the receiving coil to the four edges of the device to be charged, to determine the prompter corresponding to the perpendicular distance range.

Optionally, the method further comprises: receiving size information of the device to be charged; the generating a trigger instruction of the prompter, includes: calculate to obtain a rectangular region of an edge contour of the device to be charged when the receiving coil of the device to be charged is aligned with the transmitting coil, on a Cartesian coordinate system with the center of the transmitting coil as a coordinate origin, according to the relative positional relationship between the prompters and the transmitting coil in combination with the size information of the device to be charged, and the relative position information of the receiving coil of the device to be charged; and generate a trigger instruction of the prompter located within the rectangular region or located at a boundary of the rectangular region.

Optionally, when the prompters are a plurality of light-emitting elements, and the plurality of light-emitting elements are arranged in an array, the controller is configured to: determine or acquire row spacings of the light-emitting elements in four directions which are positive and negative directions of an x-axis and positive and negative directions of a y-axis in a coordinate system with the center of the transmitting coil as a coordinate origin; obtain the perpendicular distances from the center of the receiving coil to the four edges of the device to be charged from the first communication circuit or the memory, and determine or acquire perpendicular distances from the center of the transmitting coil to four edges formed by an innermost loop of an array constituted by the plurality of light-emitting elements; calculate a number of row of light-emitting elements that need to be lit in the four directions in which the perpendicular distances are located, according to the row spacings, the perpendicular distances from the center of the receiving coil to the four edges of the device to be charged, and the perpendicular distances from the center of the transmitting coil to the four edges formed by the innermost loop of the array constituted by the light-emitting elements.

Optionally, the method further comprises: determining whether the receiving coil of the device to be charged is aligned with the transmitting coil; if the receiving coil is aligned with the transmitting coil, generating an off instruction of the prompter to control the turned-on prompter to be turned off.

At a third aspect, an embodiment of the present disclosure provides an electronic device, the electronic device includes a receiving coil, a memory and a second communication circuit; the memory is configured to store relative position information of the receiving coil of the electronic device; and the second communication circuit is configured to send the relative position information to the wireless charging device.

Optionally, the memory is further configured to store size information of the electronic device; and the second communication circuit is configured to send the size information to the wireless charging device.

At a fourth aspect, an embodiment of the present disclosure provides a wireless charging system, the wireless charging system comprises the electronic device as mentioned above and the wireless charging device as mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

A first aspect of embodiments of the present disclosure provides a wireless charging device, which can indicate a placement position and/or a placement direction of a device to be charged, so as to solve the coil alignment problem of wireless charging to a certain extent.

Figure 1:
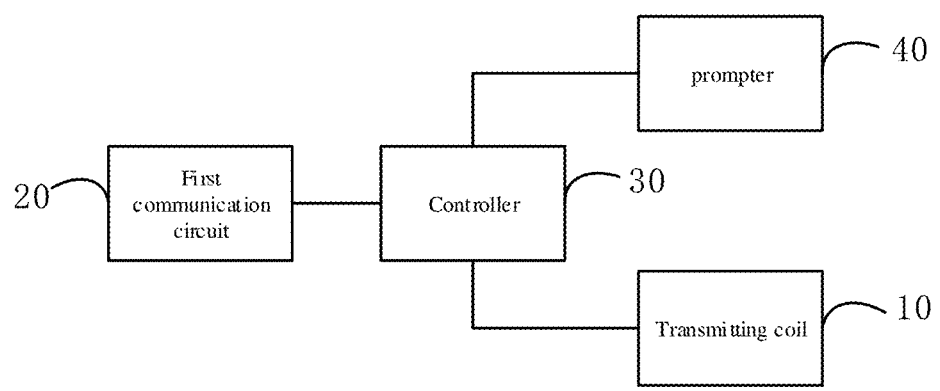
FIG. 1 is a structural schematic diagram of a wireless charging device provided by an embodiment of the present disclosure.

As shown in FIG. 1, the wireless charging device comprises a transmitting coil 10, a first communication circuit 20, a controller 30, and a plurality of prompters 40; wherein, the plurality of prompters 40 are arranged around the transmitting coil 10;

The first communication circuit 20 is configured to receive relative position information of a receiving coil of the device to be charged; wherein, the relative position information refers to a position where the receiving coil is located in the device to be charged, for example, it may be information of a certain coordinate position where the receiving coil is located in a coordinate system established with a center of the device to be charged as a coordinate origin, for example, a center of each receiving coil may have X coordinate information and Y coordinate information relative to the device to be charged as the coordinate origin.

Figure 2:
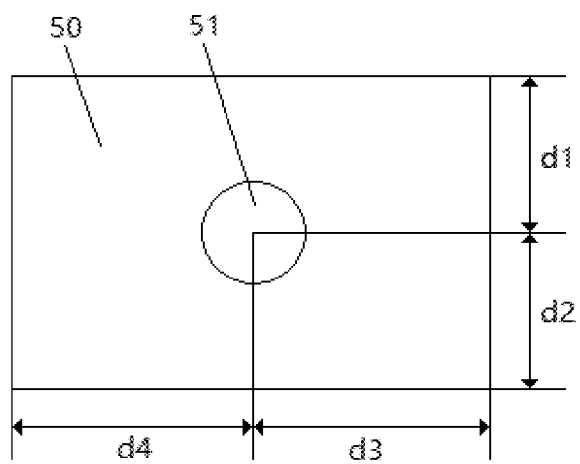
FIG. 2 is a schematic diagram of a device to be charged according to an embodiment of the present disclosure.

Alternatively, the relative position information of the receiving coil may include: perpendicular distances from the center of the receiving coil to four edges of the device to be charged; as shown in FIG. 2, the relative position information may refer to perpendicular distances d1, d2, d3 and d4 between a center of a receiving coil 51 and four edges of a device 50 to be charged; and optionally, the relative position information is stored in the device to be charged and is sent by the device to be charged to the wireless charging device.

For example, coordinate information of each receiving coil may be stored in the device to be charged, and/or perpendicular distances from a center of the receiving coil to the four edges of the device to be charged may be stored in the device to be charged. Or, the perpendicular distances from the center of the receiving coil to the four edges of the device to be charged may be obtained according to coordinate information of a center of each receiving coil, for example, with respect to a receiving coil with center coordinates of (x1, y1), where, x1 is a negative value and y1 is a positive value; positive and negative values of the coordinates represent a position where the receiving coil is located, that is, the receiving coil is located in an upper left quadrant, and perpendicular distances from the receiving coil to the four edges of the device to be charged may be obtained by respectively subtracting absolute values of x1 and y1 from lengths between the four edges of the device to be charged and the center of the device to be charged.

The controller 30 is configured to generate a trigger instruction of a prompter 40, according to the relative position information in combination with a relative positional relationship between the prompter 40 and the transmitting coil 10, and control the prompter 40 in a corresponding position to be turned on, to indicate the placement position of the device to be charged, so as to further align the transmitting coil 10 and the receiving coil 51.

For example, the controller may include a memory and a processing unit; the memory stores the relative positional relationship between the prompter and the transmitting coil as well as the relative position information, and stores program instructions; when the processing unit executes the program instructions stored in the memory, the above-described actions are performed: comparing the relative positional relationship of the prompter and the relative position information, determining which prompter is to be triggered, and sending a trigger instruction to light the prompter, etc.; for example, the processing unit may include a comparator, to compare the relative positional relationship and the relative position information, etc.

Figure 3A:
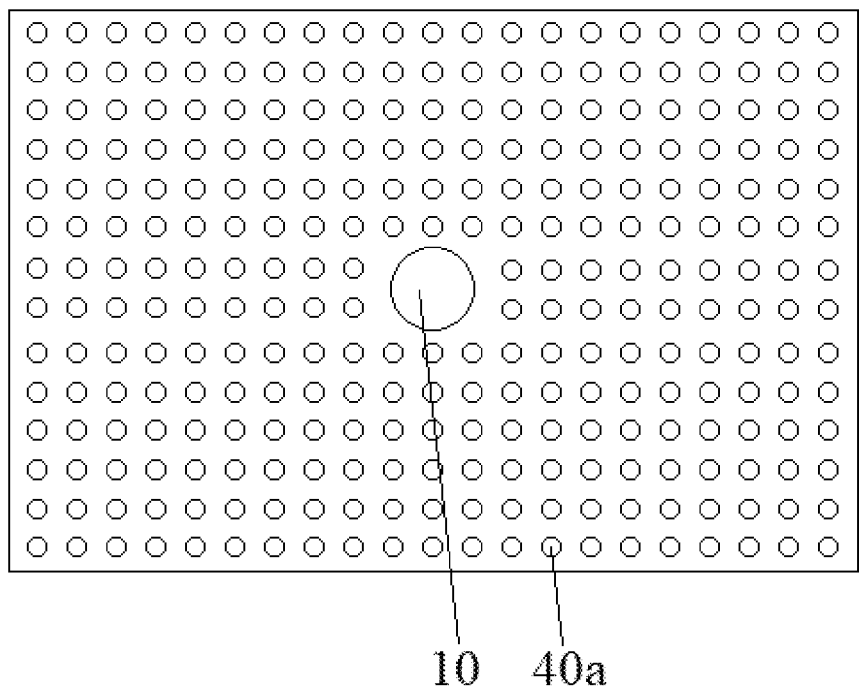
FIG. 3a is a schematic diagram of an arrangement relationship between a prompter and a transmitting coil according to an embodiment of the present disclosure.
Figure 3B:
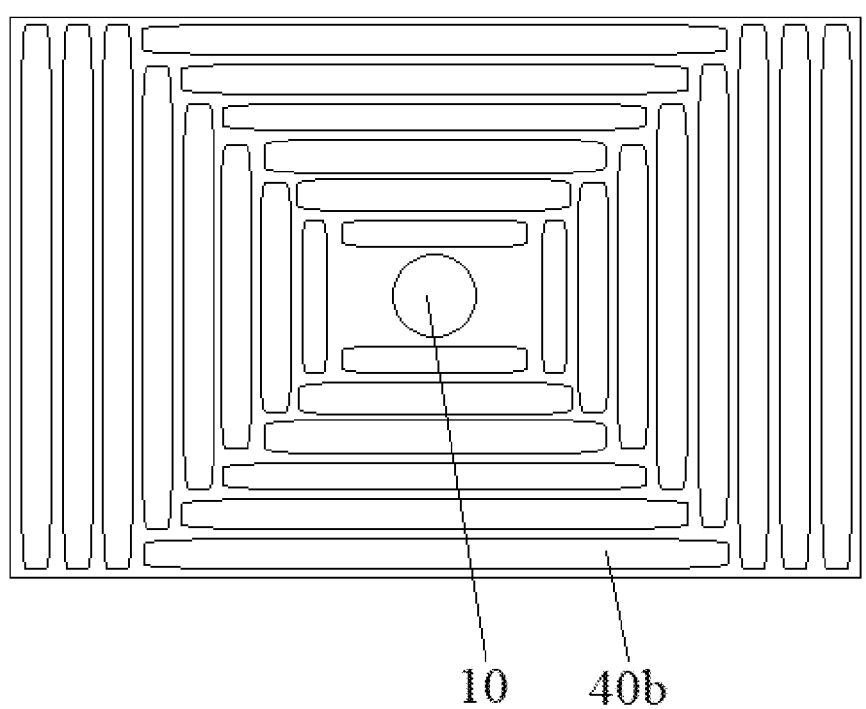
FIG. 3b is a schematic diagram of another arrangement relationship between a prompter and a transmitting coil according to an embodiment of the present disclosure.

Optionally, the prompter 40 may be a dot-shaped or a strip-shaped light-emitting element (e.g., a light-emitting diode (LED)). Wherein, dot-shaped light-emitting elements 40a may be arranged in an array, referring to FIG. 3a; for example, spacings between the dot-shaped light-emitting elements 40a in adjacent rows are equal with each other; as for the strip-shaped light-emitting elements 40b, a rectangle may be formed with four strip-shaped light-emitting elements 40b as one group, and nested arrangement is formed by a plurality of rectangles, referring to FIG. 3b. Optionally, the trigger instruction may include an instruction of controlling corresponding light-emitting element to be lit (an initial state of the light-emitting element is an off state), and an outer edge of a shape formed by the lit light-emitting elements matches an outline of the device to be charged, referring to FIG. 4a, FIG. 4b, FIG. 4c, FIG. 4d, or FIG. 5a and FIG. 5b, wherein, black light-emitting elements represent the lit light-emitting elements. Referring to FIG. 3a and FIG. 3b, the transmitting coil 10 is arranged at a center of an overall arrangement structure of the prompters 40, and the relative positional relationship between the prompters 40 and the transmitting coil 10 may be coordinates of a center of each prompter 40 in a coordinate system which is established with the transmitting coil 10 as a center. Similarly, when the transmitting coil 10 is not located at the center of the overall arrangement structure of the prompters 40, the relative positional relationship between the prompters 40 and the transmitting coil 10 may also be determined in a same coordinate system mode.

Optionally, the device to be charged may further comprise a memory; the memory is configured to store the relative position information of the receiving coil that is received by the first communication circuit, to provide the same to the controller; and the controller may directly obtain the relative position information from the first communication circuit or obtain the relative position information from the memory.

It can be seen from the above-described embodiment that, in the wireless charging device provided by the embodiment of the present disclosure, the prompter is arranged around the transmitting coil; according to the relative position information of the receiving coil of the device to be charged, and the relative positional relationship between the transmitting coil and the prompter, the trigger instruction of the prompter is generated, to control a corresponding prompter to be turned on, so as to indicate the placement position of the device to be charged; and according to the indication of the placement position given by the prompter, a user places the device to be charged in a suitable position of the wireless charging device, which, thus, can ensure alignment of the transmitting coil and the receiving coil to a certain extent, so as to further improve charging efficiency and power; meanwhile, the trigger instruction of the prompter is obtained according to the relative position information of the receiving coil of the device to be charged, so when the relative position information of the receiving coil of the device to be charged is different (e.g., the position of the receiving coil is not at the center of the device to be charged), the trigger instruction is also different, and the placement position indicated by prompter is also different, so that versatility of the wireless charging device is improved.

Figure 4A:
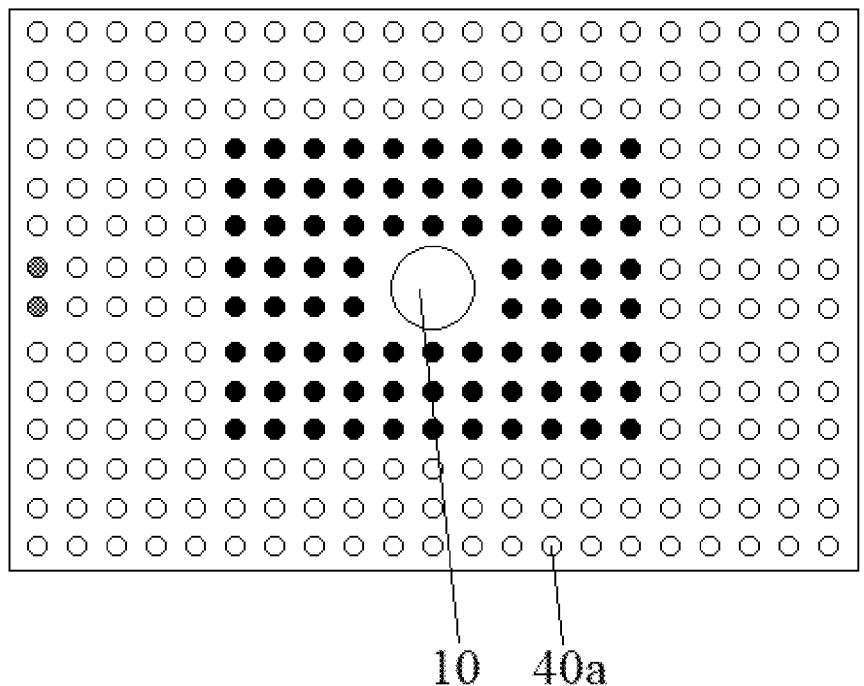
FIG. 4a is a schematic diagram of a state when the prompter makes a prompt according to an embodiment of the present disclosure.
Figure 4B:
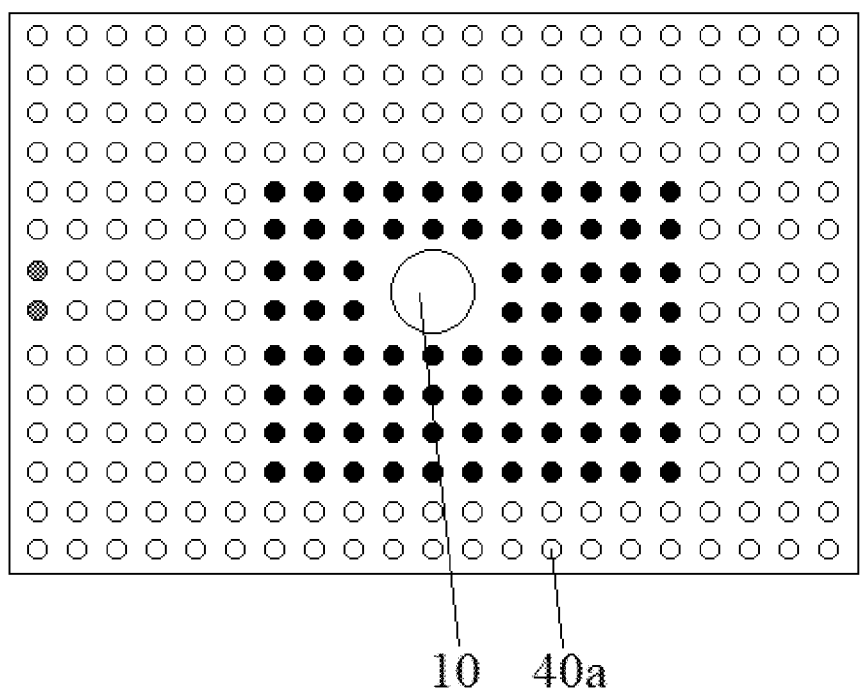
FIG. 4b is a schematic diagram of another state when the prompter makes a prompt according to an embodiment of the present disclosure.
Figure 4C:
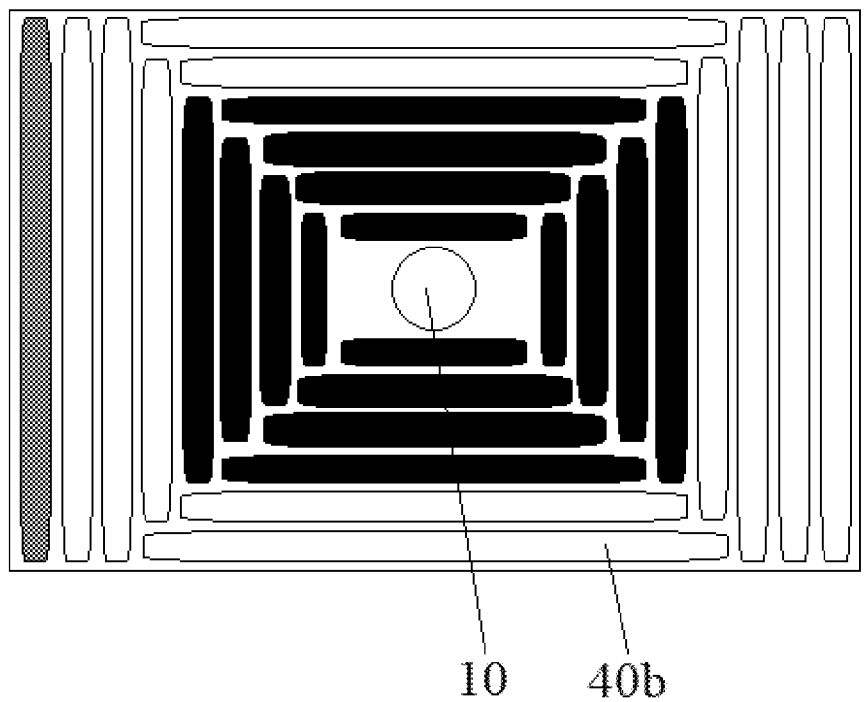
FIG. 4c is a schematic diagram of still another state when the prompter makes a prompt according to an embodiment of the present disclosure.
Figure 4D:
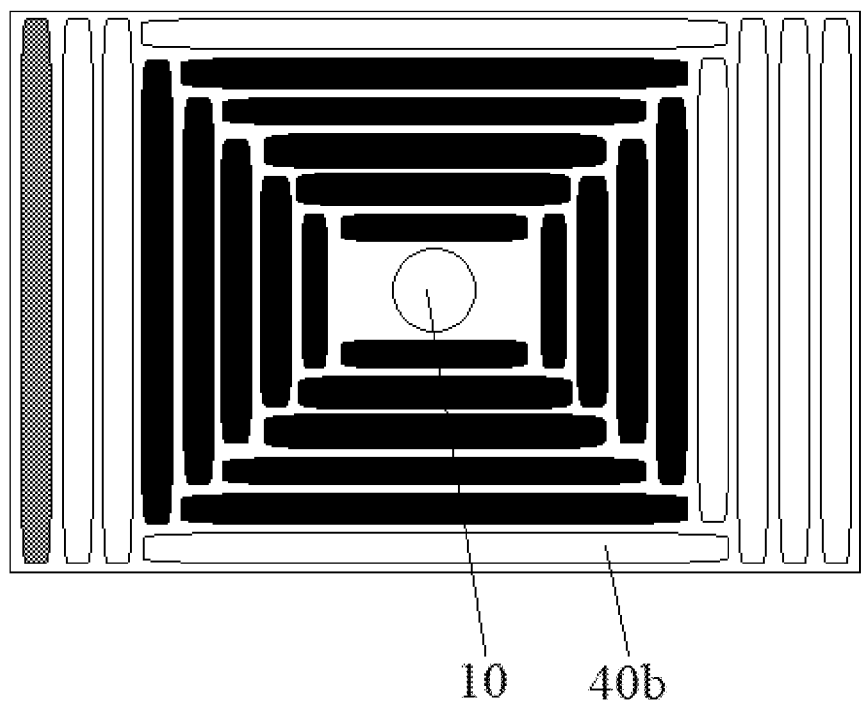
FIG. 4d is a schematic diagram of a further state when the prompter makes a prompt according to an embodiment of the present disclosure.

It can be seen that, the wireless charging device provided by the embodiment of the present disclosure may generate a corresponding trigger instruction according to the relative position information of the receiving coil of the device to be charged; when a relative position of the receiving coil in the device to be charged is different, the trigger instruction may also be different. As shown in FIG. 4a and FIG. 4c, when the receiving coil is located at the center of the device to be charged, the light-emitting units lit as controlled by the trigger instruction are symmetrically distributed with the transmitting coil as the center; as shown in FIG. 4b and FIG. 4d, when the receiving coil is not located at the center of the device to be charged, the light-emitting units lit as controlled by the trigger instruction are not symmetrically distributed with the transmitting coil as the center. This also shows that, the wireless charging device provided by the present disclosure can better implement coil alignment and has higher versatility than the prior art.

As an embodiment of the present disclosure, the plurality of dot-shaped light-emitting elements 40a are arranged in an array with the transmitting coil 10 as the center. By adopting the design, on the one hand, the light-emitting elements 40a may be lit in a corresponding manner according to the outline of the device to be charged, for example, a circle, a rectangle, or even an irregular shape; on the other hand, the transmitting coil 10 is arranged in the middle, which is more favorable for spatial arrangement of the wireless charging device, so that a utilization rate of the light-emitting element 40a is higher.

Of course, it is also conceivable that, the dot-shaped light-emitting elements 40a may not be centered on the transmitting coil 10, and a relative position of the transmitting coil 10 in the overall array of the light-emitting elements 40a may be off-center. Particularly, when most devices to be charged do not have a receiving coil located in a center of the device to be charged, such a wireless charging device with a transmitting coil non-centrally arranged can even better wirelessly charge more devices to be charged.

For example, the relative positional relationship between the prompter and the transmitting coil includes coordinate information of the prompter relative to the transmitting coil.

For example, the coordinate information is X coordinate information and Y coordinate information, and the controller is configured to: determine the prompter corresponding to a perpendicular distance range according to the perpendicular distances from the center of the receiving coil to the four edges of the device to be charged and coordinate information of the prompter relative to the transmitting coil, to generate a trigger instruction of the prompter corresponding to the perpendicular distance range or the prompter corresponding to a boundary of the perpendicular distance range.

For example, the controller is configured to: determine perpendicular distance from a prompter to the center of the transmitting coil according to the coordinate information of the prompter relative to the transmitting coil; and determine a prompter from which perpendicular distance to the center of the transmitting coil is less than or equal to perpendicular distances from the center of the receiving coil to the four edges of the device to be charged in the same direction, according to the perpendicular distances from the center of the receiving coil to the four edges of the device to be charged, to determine the prompter corresponding to the perpendicular distance range.

Figure 5A:
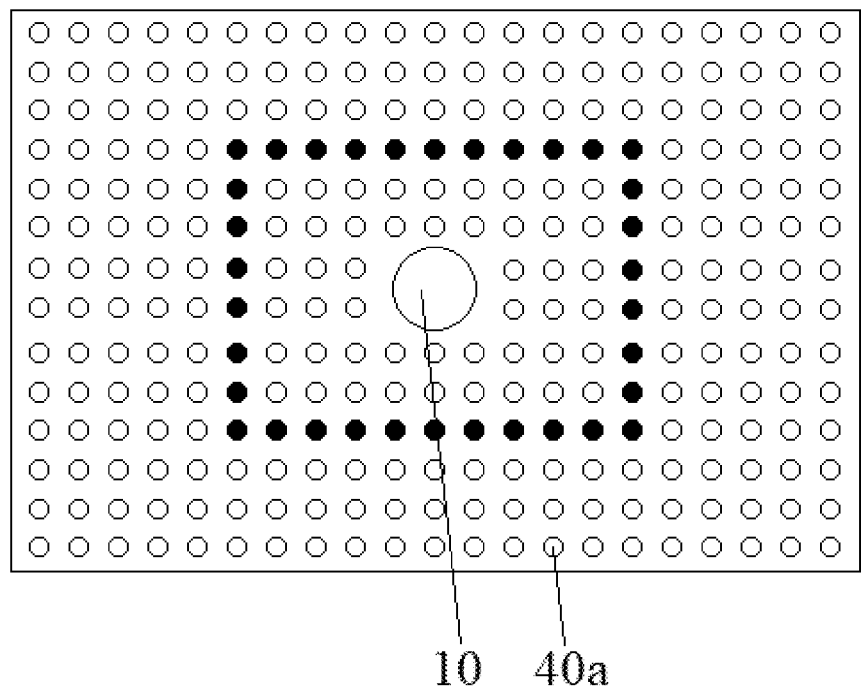
FIG. 5a is a schematic diagram of still another state when the prompter makes a prompt according to an embodiment of the present disclosure.
Figure 5B:
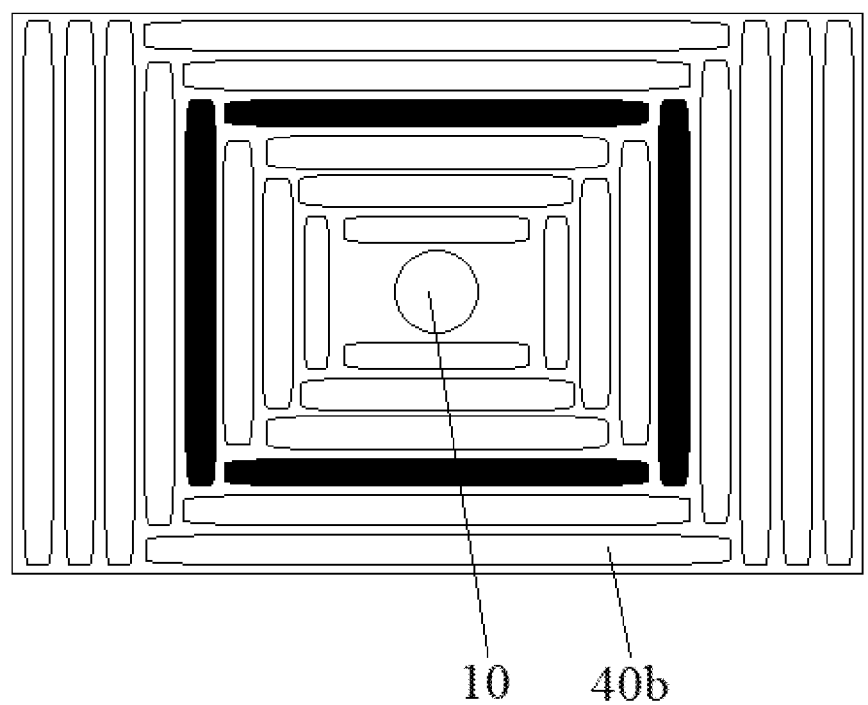
FIG. 5b is a schematic diagram of a further state when the prompter makes a prompt according to an embodiment of the present disclosure.

As an embodiment of the present disclosure, the first communication circuit is further configured to receive size information (e.g., 5 inches, 6 inches, etc.) of the device to be charged;

The controller 30 may also be specifically configured to:

Calculate a rectangular region of an edge outline of the device to be charged when the receiving coil of the device to be charged is aligned with the transmitting coil, in the Cartesian coordinate system with the center of the transmitting coil as the coordinate origin, according to the relative positional relationship between the prompter and the transmitting coil in combination with the size information of the device to be charged, and the relative position information of the receiving coil of the device to be charged; and Generate a trigger instruction of a prompter located within the rectangular region (referring to FIG. 4a, FIG. 4b, FIG. 4c and FIG. 4d) or located at a boundary of the rectangular region (referring to FIG. 5a and FIG. 5b).

In this way, the prompters constituting a shape the same as the rectangular region of the edge outline of the device to be charged are triggered, so that when the user places the device to be charged on the wireless charging device, the coils can be aligned as long as the outline of the device to be charged overlaps with the rectangular region formed by the prompters, which is convenient to use.

It should be noted that, as compared with a mode in which all the light-emitting elements within the rectangular region are lit, the mode in which only the light-emitting elements located at the boundary of the rectangular region are lit, on the one hand, can achieve a same prompt effect, and on the other hand, save energy. Of course, these two modes can both be used for implementing the prompt function, and both fall within the protection scope of the present disclosure.

Hereinafter, taking the prompter as a dot-shaped light-emitting element, the calculation mode of the trigger instruction will be introduced in conjunction with FIG. 2 and FIG. 6:

Firstly, the coordinate system is established with the center of the transmitting coil 10 as the origin.

Figure 6:
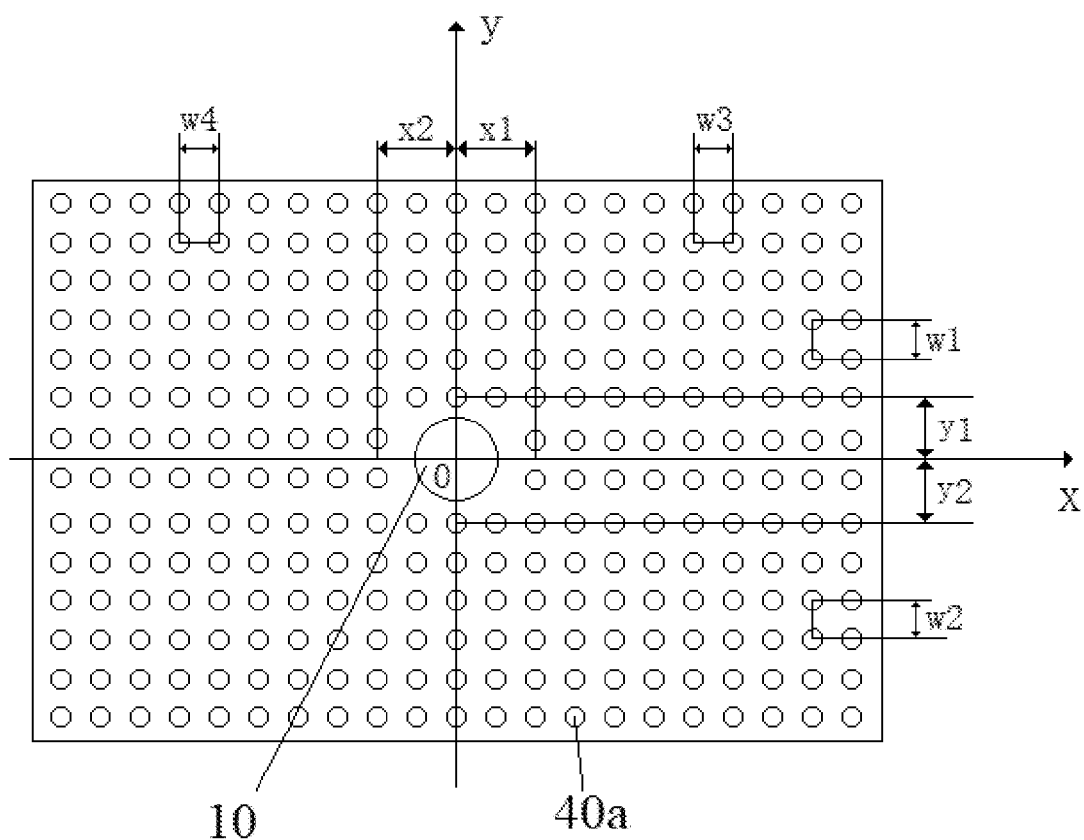
FIG. 6 is a schematic diagram of a positional relationship between respective units according to an embodiment of the present disclosure.

As shown in FIG. 6, suppose w1, w2, w3 and w4 represent distances between adjacent light-emitting elements in four directions, i.e., positive and negative directions of an x-axis and positive and negative directions of a y-axis; where, w1 represents a spacing between two adjacent rows of light-emitting elements above the x-axis; w2 represents a spacing between two adjacent rows of light-emitting elements below the x-axis; w3 represents a spacing between two adjacent columns of light-emitting elements on the right of the y-axis; and w4 represents a spacing between two adjacent columns of light-emitting elements on the left of the y-axis.

It is known that, the perpendicular distances from the center of the receiving coil of the device to be charged to the four edges of the device to be charged are d1, d2, d3 and d4 (as shown in FIG. 2); as shown in FIG. 6, perpendicular distances from the center of the transmitting coil to the four edges formed by an innermost loop of an array constituted by the light-emitting elements are y1, y2, x1 and x2; here, an absolute value must be taken for a coordinate value when it is negative, that is, absolute values are taken for coordinate values of y2 and x2;

Therefore, the number of rows of light-emitting elements lit in the four directions is:

$(d1-y1)/w1=n1;$ $(d2-y2)/w2=n2;$ $(d3-x1)/w3=n3;$ $(d4-x2)/w4=n4;$

The calculated n1, n2, n3 and n4 are rounded, to obtain 4 numbers greater than or equal to 0; and the number+1 is the number of rows of light-emitting elements lit in each direction; for example, when a calculation result is 0.5, it is rounded to 0, and light-emitting elements in an innermost row of a corresponding direction are lit;

Then, light-emitting elements in n1+1 rows, n2+1 rows, n3+1 rows and n4+1 rows or light-emitting elements in an (n1+1)th row, an (n2+1)th row, an (n3+1)th row and an (n4+1)th row in the four directions are respectively lit (from a center to an edge of the wireless charging device, the row number of light-emitting elements is 1, 2, 3 . . . ni+1).

Here, light-emitting elements exceeding the rectangular region formed by d1, d2, d3 and d4 are not lit even if they are located in a corresponding row that should be lit, so that the shape of the lit region matches with the outline of the device to be charged.

It can be seen that, after using the above-described calculation method, arrangement of the dot-shaped light-emitting element array may have different row spacings in the four directions with the transmitting coil as the center, and the range of light-emitting elements that need to be lit can also be calculated; so, row spacings of the dot-shaped light-emitting element array in the four directions do not have to be equal to each other.

However, for example, when spacings between adjacent rows of the dot-shaped light-emitting elements 40a are equal, that is, in FIG. 6, w1=w2; w3=w4, on the one hand, it is convenient to calculate, and on the other hand, array distribution is more regular and suitable for industrial production.

Further, when the receiving coil is not located at the center of the device to be charged, turning on the prompters which form a shape whose outer edge matches the outline of the device to be charged, can only indicate the placement position of the device to be charged, but cannot indicate the placement direction. For example, suppose the device to be charged is a mobile phone, which has a top portion (usually for placing a front camera) and a bottom portion (usually for placing a home button), if only a region size is indicated regardless of whether a direction is reversed or positive, when the coil position is not located at the center of the device, placement in a reversed direction will cause a problem of coil misalignment.

Therefore, as an optional implementation mode, the trigger instruction further includes an instruction of controlling corresponding light-emitting element (or prompter) to indicate the placement direction of the device to be charged. For example, the instruction of controlling the corresponding light-emitting element (or prompter) to indicate the placement direction of the device to be charged is controlling the corresponding light-emitting element to be lit, or to light the corresponding light-emitting element with other colors which are different from a lighting color of the light-emitting elements indicating the placement position, to indicate the placement direction. For example, taking FIG. 4a as an example, two light-emitting elements located close to a left side of the light-emitting element array are lit (the number here is only an example, and the actual number and a specific position may be adjusted), to indicate an orientation of the top portion (which is usually an end for placing the front camera and an earpiece) of the device to be charged; for example, suppose the light-emitting elements for indicating the placement position emit white light, the light-emitting elements for indicating the placement direction may emit red light or other light playing a prompting role that is different from white light. Similarly, taking FIG. 5b as an example, the light-emitting element 40b lit for indicating the placement direction may be a strip-shaped light-emitting element located on the left side.

It should be noted that, except the above-described embodiment, it is conceivable that, the strip-shaped light-emitting elements 40b and the dot-shaped light-emitting elements 40a actually may also be arranged in the same wireless charging device in an intermixed manner to jointly play a prompting role. In addition to the light-emitting prompter, other prompting mode, such as adding a sound element and meanwhile giving prompt information in a sound manner, or combining sound and light to prompt jointly, may also be combined.

As an optional implementation mode of the present disclosure, the controller 30 may further be configured to:

Determine whether the receiving coil of the device to be charged is aligned with the transmitting coil;

If the receiving coil is aligned with the transmitting coil, generate an off instruction of the prompter to control the turned-on prompter to be turned off.

For example, the controller judges whether the receiving coil and the transmitting coil are aligned by receiving an electromagnetic intensity which is received by the device to be charged and thus emitted by the device to be charged; if there is no deviation or very small deviation of the electromagnetic intensity received and thus emitted by the device to be charged from a strongest magnetic field intensity of the transmitting coil, for example, within 10%, the controller may determine that the two are aligned and turn off the prompters. If the deviation is relatively large, for example, larger than 10%, the controller may determine that the two are not aligned, so that the controller may control the wireless charging device to prompt the user to adjust the position of the device to be charged by means of an alarm sound or an alarm light, so as to align the two.

The method of how the controller judges whether the receiving coil and the transmitting coil are aligned will not be limited by the embodiment of the present disclosure, as long as the judgment function can be implemented.

In this way, energy can be saved by turning off the prompter after the coils are aligned, and meanwhile, by turning off the prompter, it also reminds the user that the charging coils are currently aligned.

It should also be noted that, in addition to the above-described embodiment, it is conceivable that the wireless charging device may also have two or more transmitting coils, which are respectively configured to wirelessly charge different devices to be charged. A design idea thereof is similar to that of the foregoing wireless charging device with only one transmitting coil, as long as enough placement space is left for the prompters between the transmitting coils.

In addition, the wireless charging device may further comprise a plate-shaped housing 60; the transmitting coil 10, the first communication circuit 20 and the controller 30 are all arranged inside the plate-shaped housing; and the plurality of prompters 40 may be arranged outside the plate-shaped housing, or may also be arranged inside the plate-shaped housing.

Figure 7A:
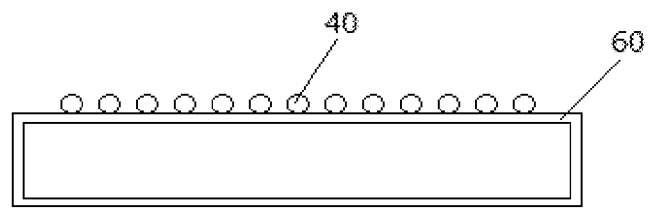
FIG. 7a is a schematic diagram of a structural relationship between a plate-shaped housing and the prompter of a wireless charging apparatus according to an embodiment of the present disclosure.
Figure 7B:
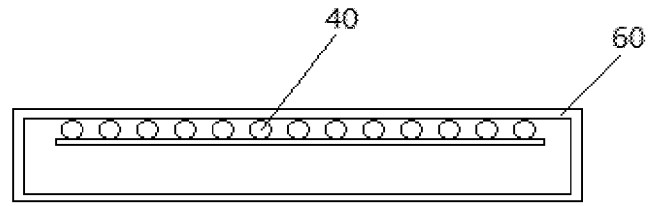
FIG. 7b is a schematic diagram of another structural relationship between the plate-shaped housing and the prompter of the wireless charging apparatus according to the embodiment of the present disclosure.

FIG. 7a shows a cross-sectional view of the wireless charging device; the prompter 40 may be arranged on an upper surface of a carrying plate of the plate-shaped housing 60 where the device to be charged is placed. FIG. 7b shows another cross-sectional view of the wireless charging device; the prompters 40 may also be arranged below the carrying plate of the plate-shaped housing 60 where the device to be charged is placed. When the prompters 40 are arranged below the carrying plate of the plate-shaped housing 60, if the prompters 40 are light-emitting elements, in order that light can be emitted out of the plate-shaped housing 60, the carrying plate may be transparent or translucent. When the carrying plate is translucent, the light-emitting elements need to be arranged as close as possible to a lower surface of the carrying plate, so that light can be emitted out of the plate-shaped housing 60 to a greatest extent. Meanwhile, it can be seen that, when the prompters 40 are arranged inside the plate-shaped housing 60, arrangement of the prompters 40 will not affect placement of the device to be charged; in addition, when the carrying plate is in a translucent state, a shape and a contour of the prompter 40 may be blurred to a certain extent, so that appearance of the wireless charging device is more beautiful.

A second aspect of the embodiments of the present disclosure proposes a wireless charging method applied to any embodiment of the foregoing wireless charging device or combination of the embodiments, which can solve the coil alignment problem of wireless charging to a certain extent.

Figure 8:
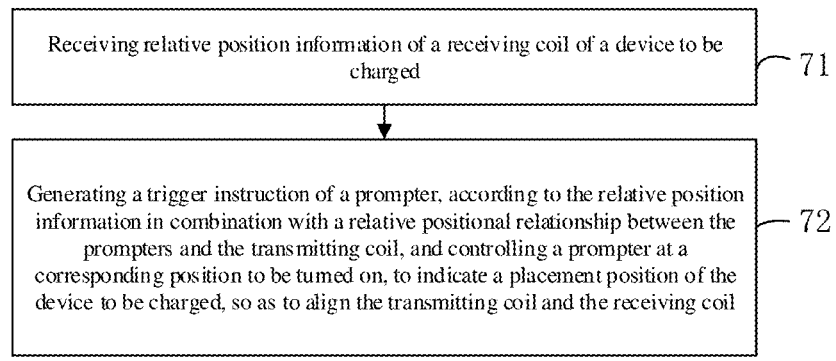
FIG. 8 is a schematic flow chart of an embodiment of a wireless charging method provided by the present disclosure.

As shown in FIG. 8, the wireless charging method comprises steps of:

Step 71: receiving relative position information of a receiving coil of a device to be charged;

Step 72: generating a trigger instruction of a prompter, according to the relative position information in combination with a relative positional relationship between the prompter and the transmitting coil, and controlling the prompter in a corresponding position to be turned on, to indicate a placement position of the device to be charged, so as to further align the transmitting coil and the receiving coil.

It can be seen from the above-described embodiment that, in the wireless charging method applied to the wireless charging device provided by the embodiment of the present disclosure, the prompter is arranged around the transmitting coil; according to the relative position information of the receiving coil of the device to be charged, and the relative positional relationship between the transmitting coil and the prompter, the trigger instruction of the prompter is generated, to control corresponding prompter to be turned on, so as to indicate the placement position of the device to be charged; and according to the indication of the placement position given by the prompter, a user places the device to be charged in a suitable position of the wireless charging device, which, thus, can ensure alignment of the transmitting coil and the receiving coil to a certain extent, so as to further improve charging efficiency and power; meanwhile, the trigger instruction of the prompter is obtained according to the relative position information of the receiving coil of the device to be charged, so when the relative position information of the receiving coil of the device to be charged is different (e.g., the position of the receiving coil is not at a center of the device to be charged), the trigger instruction is also different, and the placement position indicated by prompter is also different, so that versatility of the wireless charging apparatus is improved.

As an optional implementation mode of the present disclosure, the wireless charging method further comprises: receiving size information of the device to be charged;

The generating a trigger instruction of the prompter may specifically include steps of:

Calculating to obtain a rectangular region of an edge contour of the device to be charged when the receiving coil of the device to be charged is aligned with the transmitting coil, on a Cartesian coordinate system with a center of the transmitting coil as a coordinate origin, according to the relative positional relationship between the prompter and the transmitting coil in combination with the size information of the device to be charged, and the relative position information of the receiving coil of the device to be charged; and Generating a trigger instruction of the prompter located within the rectangular region or located at a boundary of the rectangular region.

For example, the relative positional relationship between the prompter and the transmitting coil includes coordinate information of the prompter relative to the transmitting coil, and the relative position information of the receiving coil includes perpendicular distances from the center of the receiving coil to the four edges of the device to be charged.

For example, the generating a trigger instruction of the prompter, according to the relative position information in combination with a relative positional relationship between the prompter and the transmitting coil, includes:

Determining a prompter corresponding to a perpendicular distance range according to the perpendicular distances from the center of the receiving coil to the four edges of the device to be charged and coordinate information of the prompter relative to the transmitting coil, to generate a trigger instruction of the prompter corresponding to the perpendicular distance range or the prompter corresponding to a boundary of the perpendicular distance range.

For example, the coordinate information is X coordinate information and Y coordinate information, and the determining a prompter corresponding to a perpendicular distance range, to generate a trigger instruction of the prompter corresponding to the perpendicular distance range or the prompter corresponding to a boundary of the perpendicular distance range, includes: determining a perpendicular distance from the prompter to the center of the transmitting coil according to the coordinate information of the prompter relative to the transmitting coil; and determining a prompter from which perpendicular distance to the center of the transmitting coil is less than or equal to perpendicular distances from the center of the receiving coil to the four edges of the device to be charged in the same directions, according to the perpendicular distances from the center of the receiving coil to the four edges of the device to be charged, to determine the prompter corresponding to the perpendicular distance range.

As an optional implementation mode of the present disclosure, the wireless charging method may further comprise steps of:

Determining whether the receiving coil of the device to be charged is aligned with the transmitting coil;

If the receiving coil is aligned with the transmitting coil, generating an off instruction of the prompter to control the turned-on prompter to be turned off.

In this way, energy can be saved by turning off the prompter after the coils are aligned, and meanwhile, by turning off the prompter, it also reminds the user that the charging coils are currently aligned.

A third aspect of the embodiments of the present disclosure proposes an electronic apparatus, which can solve the coil alignment problem of wireless charging to a certain extent.

Figure 9:
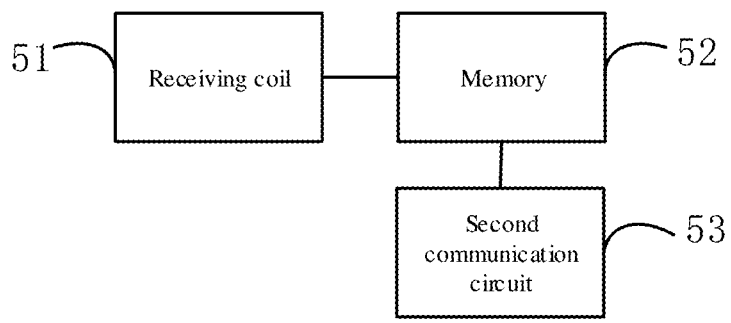
FIG. 9 is a structural schematic diagram of an embodiment of an electronic device provided by the present disclosure.

As shown in FIG. 9, the electronic device 50 comprises a receiving coil 51, a memory 52 and a second communication circuit 53;

The memory 52 is configured to store relative position information of the receiving coil 51 of the electronic device (e.g., d1, d2, d3 and d4 in FIG. 2);

The second communication circuit 53 is configured to send the relative position information to the wireless charging device.

It can be seen from the above-described embodiment that, the electronic device provided by the embodiment of the present disclosure may send the relative position information of its own receiving coil to the wireless charging device, so as to cause the wireless charging device to indicate the placement position, so that the receiving coil can be aligned with the transmitting coil of the wireless charging device, to improve charging efficiency.

The electronic device may be a device such as a mobile phone and a tablet personal computer that supports wireless charging, or may also be other electronic device that can support wireless charging.

Optionally, the memory 52 is further configured to store size information of the electronic device 50 (e.g., 5 inches or 6 inches, etc.); and the second communication circuit 53 is further configured to send the size information to the wireless charging device. By supplying the size information to the wireless charging device, the transmitting coil and the receiving coil can be aligned more accurately, and meanwhile, versatility of the wireless charging apparatus can be improved.

Optionally, before starting charging, the electronic device sends a charging request to the wireless charging device through the second communication circuit 53, and after the wireless charging device responds to the charging request, sends the relative position information of the receiving coil in the electronic device and the size information of the electronic device to the wireless charging device.

A fourth aspect of the embodiments of the present disclosure proposes a wireless charging system, which can solve the coil alignment problem of wireless charging to a certain extent.

The wireless charging system comprises the embodiment of the electronic device as described above and any embodiment of the wireless charging device or combination of the embodiments as described above.

It can be seen from the above that, in the wireless charging system provided by the embodiment of the present disclosure, a prompter is arranged around a transmitting coil of the wireless charging device; according to relative position information of a receiving coil of a device to be charged, and relative positional relationship between the transmitting coil and the prompter, a trigger instruction of a prompter is generated, to control a corresponding prompter to be turned on, so as to indicate a placement position of the device to be charged; and according to indication of the placement position given by the prompter, a user places the device to be charged in a suitable position of the wireless charging device, which, thus, can ensure alignment of the transmitting coil and the receiving coil to a certain extent, so as to further improve charging efficiency and power; and meanwhile, versatility of the wireless charging apparatus is also improved.

It should be noted that, the wireless charging system may comprise a wireless charging device sold as an add-on or given as a gift while selling the electronic device; however, based on characteristics of the wireless charging device and the electronic device themselves according the embodiments of the present disclosure, the electronic device is also compatible with other wireless charging device, and the wireless charging device certainly can also be universally used in other electronic device, so the two may exist as separate products.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should understood that, in the case in which a component or element such as a layer, film, region, substrate or the like is referred to be "on" or "under" another component or element, it may be directly on or under the another component or element or a component or element is interposed therebetween.

(3) In case of no conflict, features in one embodiment or in different embodiments can be combined to obtain a new embodiment.

In case of no conflict, embodiments of the present disclosure or features in one embodiment or in different embodiments can be combined.

What are described above is related to the specific embodiments of the disclosure only and not limitative to the scope of the disclosure. Any modification and equivalent replacement may be made by those skilled in the art within the substantial protection scope of the embodiments of the present disclosure, which is regarded as falling within the protection scope of embodiments of the present disclosure. The protection scope of the disclosure shall be based on the protection scope of the claims.

The application claims priority to the Chinese patent application No. 201910001614.4, filed Jan. 2, 2019, the disclosure of which is incorporated herein by reference as part of the application.

The invention claimed is:

1. A wireless charging device, comprising:
a transmitting coil;
a first communication circuit, configured to receive relative position information of a receiving coil of a device to be charged;
a plurality of prompters, the plurality of prompters being arranged around the transmitting coil; and
a controller, configured to generate a trigger instruction of the prompter, according to the relative position information in combination with a relative positional relationship between the plurality of prompters and the transmitting coil, and control the prompter at a corresponding position to be turned on, to indicate a placement position of the device to be charged, so as to align the transmitting coil and the receiving coil,
wherein, the first communication circuit is configured to receive size information of the device to be charged;
the controller is further configured to:
calculate to obtain a rectangular region of an edge contour of the device to be charged when the receiving coil of the device to be charged is aligned with the transmitting coil, on a Cartesian coordinate system with the center of the transmitting coil as a coordinate origin, according to the relative positional relationship between the prompters and the transmitting coil in combination with the size information of the device to be charged, and the relative position information of the receiving coil of the device to be charged; and
generate a trigger instruction of the prompter located within the rectangular region or located at a boundary of the rectangular region,
wherein, when the prompters are a plurality of light-emitting elements, and the plurality of light-emitting elements are arranged in an array, the controller is configured to:
determine or acquire row spacings of the light-emitting elements in four directions which are positive and negative directions of an x-axis and positive and negative directions of a y-axis in a coordinate system with the center of the transmitting coil as the coordinate origin;
obtain the perpendicular distances from the center of the receiving coil to the four edges of the device to be charged from the first communication circuit or the memory, and determine or acquire perpendicular distances from the center of the transmitting coil to four edges formed by an innermost loop of an array constituted by the plurality of light-emitting elements;
calculate a number of row of light-emitting elements that need to be lit in the four directions in which the perpendicular distances are located, according to the row spacings, the perpendicular distances from the center of the receiving coil to the four edges of the device to be charged, and the perpendicular distances from the center of the transmitting coil to the four edges formed by the innermost loop of the array constituted by the plurality of light-emitting elements.

2. The wireless charging device according to claim 1, wherein, the plurality of prompters are a plurality of light-emitting elements, and the plurality of light-emitting elements are arranged in an array.

3. The wireless charging device according to claim 2, wherein, the plurality of the light-emitting elements are arranged in an array with the transmitting coil as a center.

4. The wireless charging device according to claim 2, wherein, the trigger instruction includes an instruction of controlling a corresponding light-emitting element to be lit; and an outer edge of a shape formed by the lit light-emitting element matches an outline of the device to be charged,
wherein the trigger instruction further includes an instruction of controlling a corresponding light-emitting element to indicate a placement direction of the device to be charged.

5. The wireless charging device according to claim 1, wherein, the relative position information of the receiving coil includes: perpendicular distances from a center of the receiving coil to four edges of the device to be charged.

6. The wireless charging device according to claim 1, wherein, the relative positional relationship between the plurality of prompters and the transmitting coil includes coordinate information of the plurality of prompters relative to the transmitting coil.

7. The wireless charging device according to claim 6, wherein, the coordinate information is X coordinate information and Y coordinate information; and the controller is configured to: determine a prompter corresponding to a perpendicular distance range according to the perpendicular distances from the center of the receiving coil to the four edges of the device to be charged and the coordinate information of the plurality of prompters relative to the transmitting coil, to generate a trigger instruction of the prompter corresponding to the perpendicular distance range or the prompter corresponding to a boundary of the perpendicular distance range.

8. The wireless charging device according to claim 7, wherein, the controller is configured to: determine a perpendicular distance from the prompter to the center of the transmitting coil according to the coordinate information of the prompter relative to the transmitting coil; and determine a prompter from which perpendicular distances to the center of the transmitting coil are less than or equal to the perpendicular distances from the center of the receiving coil to the four edges of the device to be charged in a same direction, according to the perpendicular distances from the center of the receiving coil to the four edges of the device to be charged, to determine the prompter corresponding to the perpendicular distance range.

9. A wireless charging system, comprising an electronic device and the wireless charging device according to claim 1,
- wherein the electronic device includes a receiving coil, a memory and a second communication circuit, the memory is configured to store relative position information of the receiving coil of the electronic device; and the second communication circuit is configured to send the relative position information to the wireless charging device,
- wherein, the memory is further configured to store size information of the electronic device; and
- the second communication circuit is configured to send the size information to the wireless charging device.

10. A wireless charging method applied to the wireless charging device according to claim 1, comprising:
- receiving relative position information of a receiving coil of a device to be charged;
- generating a trigger instruction of the prompter, according to the relative position information in combination with a relative positional relationship between the prompters and the transmitting coil, and controlling the prompter at a corresponding position to be turned on, to indicate a placement position of the device to be charged, so as to align the transmitting coil and the receiving coil,
- wherein the method further comprises: receiving size information of the device to be charged;
- the generating a trigger instruction of the prompter, includes:
- calculate to obtain a rectangular region of an edge contour of the device to be charged when the receiving coil of the device to be charged is aligned with the transmitting coil, on a Cartesian coordinate system with the center of the transmitting coil as a coordinate origin, according to the relative positional relationship between the prompters and the transmitting coil in combination with the size information of the device to be charged, and the relative position information of the receiving coil of the device to be charged; and
- generate a trigger instruction of the prompter located within the rectangular region or located at a boundary of the rectangular region,
- wherein, when the prompters are a plurality of light-emitting elements, and the plurality of light-emitting elements are arranged in an array, the controller is configured to:
- determine or acquire row spacings of the light-emitting elements in four directions which are positive and negative directions of an x-axis and positive and negative directions of a y-axis in a coordinate system with the center of the transmitting coil as a coordinate origin;
- obtain the perpendicular distances from the center of the receiving coil to the four edges of the device to be charged from the first communication circuit or the memory, and determine or acquire perpendicular distances from the center of the transmitting coil to four edges formed by an innermost loop of an array constituted by the plurality of light-emitting elements;
- calculate a number of row of light-emitting elements that need to be lit in the four directions in which the perpendicular distances are located, according to the row spacings, the perpendicular distances from the center of the receiving coil to the four edges of the device to be charged, and the perpendicular distances from the center of the transmitting coil to the four edges formed by the innermost loop of the array constituted by the light-emitting elements.

11. The method according to claim 10, wherein, the relative positional relationship between the prompters and the transmitting coil includes coordinate information of the prompters relative to the transmitting coil, and
- the relative position information of the receiving coil includes perpendicular distances from a center of the receiving coil to four edges of the device to be charged.

12. The method according to claim 11, wherein, the generating a trigger instruction of the prompter, according to the relative position information in combination with a relative positional relationship between the prompters and the transmitting coil, includes:
- determining the prompter corresponding to a perpendicular distance range according to the perpendicular distances from the center of the receiving coil to the four edges of the device to be charged and coordinate information of the prompters relative to the transmitting coil, to generate a trigger instruction of the prompter corresponding to the perpendicular distance range or the prompter corresponding to a boundary of the perpendicular distance range.

13. The method according to claim 12, wherein, the coordinate information is X coordinate information and Y coordinate information,
- the determining the prompter corresponding to a perpendicular distance range, to generate a trigger instruction of the prompter corresponding to the perpendicular distance range or the prompter corresponding to a boundary of the perpendicular distance range, includes:
- determining a perpendicular distance from the prompter to the center of the transmitting coil according to the coordinate information of the prompter relative to the transmitting coil; and determining a prompter from which perpendicular distances to the center of the transmitting coil are less than or equal to perpendicular distances from the center of the receiving coil to the four edges of the device to be charged in a same direction, according to the perpendicular distances from the center of the receiving coil to the four edges of the device to be charged, to determine the prompter corresponding to the perpendicular distance range.

14. The method according to claim 10, further comprising:
- determining whether the receiving coil of the device to be charged is aligned with the transmitting coil;
- if the receiving coil is aligned with the transmitting coil, generating an off instruction of the prompter to control the turned-on prompter to be turned off.

* * * * *